United States Patent
Kintz

[19]

[11] Patent Number: 6,118,414
[45] Date of Patent: Sep. 12, 2000

[54] VIRTUAL REALITY SYSTEM AND METHOD

[76] Inventor: Gregory J. Kintz, 680 Emily Dr., Mountain View, Calif. 94111

[21] Appl. No.: 08/982,348

[22] Filed: Dec. 2, 1997

[51] Int. Cl.[7] .................................................. G09G 5/00
[52] U.S. Cl. ................................. 345/7; 345/7; 345/31; 348/36; 348/37; 348/39; 434/40; 434/44
[58] Field of Search ..................... 345/31, 8, 7; 348/36, 348/37, 39, 63, 67; 434/40, 38, 44

[56] References Cited

U.S. PATENT DOCUMENTS

| | | |
|---|---|---|
| 3,709,581 | 1/1973 | McGlasson . |
| 3,740,469 | 6/1973 | Herndon . |
| 3,784,742 | 1/1974 | Burnham et al. . |
| 3,807,849 | 4/1974 | Lobb . |
| 3,880,509 | 4/1975 | Herndon . |
| 3,895,861 | 7/1975 | Herndon . |
| 3,998,532 | 12/1976 | Dykes ....................................... 352/69 |
| 4,167,311 | 9/1979 | Pund . |
| 4,234,891 | 11/1980 | Beck et al. . |
| 4,294,515 | 10/1981 | Kaufman . |
| 4,350,489 | 9/1982 | Gdovin . |
| 4,355,328 | 10/1982 | Kulik . |
| 4,370,677 | 1/1983 | Baldwin et al. ........................ 358/225 |
| 4,383,740 | 5/1983 | Bordovsky . |
| 4,492,442 | 1/1985 | Gaudyn . |
| 4,656,506 | 4/1987 | Ritchey . |
| 4,717,248 | 1/1988 | LaRussa . |
| 4,772,942 | 9/1988 | Tuck . |
| 4,793,687 | 12/1988 | Shenker et al. . |
| 4,901,140 | 2/1990 | Lang et al. . |
| 4,969,732 | 11/1990 | Wright et al. . |
| 4,977,323 | 12/1990 | Jehle . |
| 4,983,031 | 1/1991 | Solomon . |
| 5,030,100 | 7/1991 | Hilderman . |
| 5,097,325 | 3/1992 | Dill . |
| 5,130,794 | 7/1992 | Ritchey . |
| 5,137,348 | 8/1992 | Lacroix . |
| 5,161,054 | 11/1992 | Williams, Jr. et al. . |
| 5,189,452 | 2/1993 | Hodson et al. . |
| 5,325,386 | 6/1994 | Jewell et al. . |
| 5,331,149 | 7/1994 | Spitzer et al. ........................... 250/221 |
| 5,347,644 | 9/1994 | Sedlmayr . |
| 5,448,287 | 9/1995 | Hull . |
| 5,463,434 | 10/1995 | Kanayama et al. . |
| 5,473,454 | 12/1995 | Blanchard . |
| 5,552,839 | 9/1996 | Kühl . |
| 5,566,370 | 10/1996 | Young ....................................... 348/36 |
| 5,585,813 | 12/1996 | Howard . |
| 5,601,353 | 2/1997 | Naimark et al. . |
| 5,606,454 | 2/1997 | Williams et al. ........................ 359/462 |
| 5,625,372 | 4/1997 | Hildebrand et al. . |
| 5,790,182 | 8/1998 | St. Hilaire ................................ 348/36 |

OTHER PUBLICATIONS

Burdea et al., "Entertainment, Arts and Education—Education" *Virtual Reality Technology*, John Wiley & Sons, pp. 280–289 (1994).

Wandell, "Useful Quantities in Vision Science", *Foundations of Vision*, Sinauer Associates, Inc., inside front cover–unpaginated (1995).

*Primary Examiner*—Steven J. Saras
*Assistant Examiner*—Amr Awad
*Attorney, Agent, or Firm*—Townsend & Townsend & Crew LLP

[57] ABSTRACT

A novel display system for observing virtual and real images. The display system includes a light redirection surface or reflective surface (e.g, mirrored surface) to display, for example, a virtual image. The system also has a light emitting surface, or LES, which includes first and second sides directly opposite from each other. The LES emits light to form the virtual image at an apparent distance behind the reflective surface. An observing region is also included on the second side of the LES for observing the image through the LES.

30 Claims, 16 Drawing Sheets

VIRTUAL REALITY SYSTEM AND METHOD

BACKGROUND OF THE INVENTION

The present invention relates to virtual reality systems and methods. More particularly, the present invention provides a novel light emitting surface for providing a virtual image behind a surface. The virtual image can be viewed by an observer at large viewing angles for providing a relatively clear and realistic image. A variety of techniques have been used or proposed for viewing an image in a display system. Display systems can either be real image display systems or virtual image display systems. A typical real image display system generally includes a display surface, where an image is formed, and a control source, which creates an image including animated or still images onto the display. A human user often views the image on the display surface.

Known examples of real image display systems are movie theaters and cathode ray tubes, CRT. In a movie theater, the display surface is the screen where the image is projected and the control source is the film and the projector. In a CRT, the display surface is the phosphor coated faceplate of the CRT and the control source is the electron gun and associated electronics. A typical virtual image display system generally includes an optical system where the image is viewed and a control source, which creates images including animated or still images for the optical system. A human user observes the image though the optical system. Known examples of virtual image display systems include the image in a mirror and the image in a magnifying lens. In a mirror, the optical system is the mirror itself, and the control source is the real objects observed by the reflection in the mirror. In a magnifying lens, the optical system is the magnifying lens and the control source is the real objects under the magnifying lens. For the magnifying lens, the image is only in focus as perceived by the human observer when the distance between the lens and the control source is less than the focal length of the magnifying lens.

In more complex applications, techniques have been proposed to provide a panoramic view of a real image or in some cases a panoramic virtual image. A panoramic view is an image either real or virtual with a large field of view such that the observer sees the image fill a large portion of the view of the human vision system, the eyes. The human vision system has a well known field of view or visual field. Typically, a human can see with a horizontal field of view of 200 degrees and a vertical field of view of 135 degrees. (*Foundations of Vision*, Brian A. Wandell, Sinauer Associates Inc. Sunderland, Mass. 1995)

A known example of a panoramic display system is a planetarium. In a planetarium, the display surface is the dome of the planetarium, and the control source is a projection system which projects light from the control source to the dome of the planetarium. The observer views the projected image on the dome of the planetarium. The image is panoramic covering a very wide field of view, typically half of the total available field of view for the observers. Planetariums and similar panoramic display systems suffer from some problems. First, only observers standing near the center of the planetarium generally see an undistorted image. Observers standing near the edge of the planetarium begin to see the effects of the curvature of the dome surface on the image. Second, light from one region of the image projected onto the dome can scatter onto another region of the dome and then scatter into the observers eye, which causes a reduction in the perceived image quality. This reduction of image quality is commonly referred to as a reduction in the contrast ratio of an image. Third, to create the perception that the image is far away, the planetarium should be large. Typically planetariums are many tens of feet in diameter, and usually specifically constructed buildings are used for planetariums. Fourth, due to the large physical size of the planetariums, large amounts of light are required to illuminate the image on the surface of the dome of the planetarium.

Virtual panoramic display systems are also known. Many virtual display systems have several advantages over real display systems. First, most virtual display systems can provide a collimated image, i.e., the virtual image is apparently very far away, thus the virtual display system is generally more compact than a real display system. Second, a virtual display system in general requires less light because the virtual display system is more compact than a real display. Third, since the path of the light is controlled by the optical system, multiple scattering effects which can reduce the contrast ratio can be reduced or eliminated. Many virtual display systems have a disadvantage over a real display systems. One disadvantage is optical aberrations, i.e. distortions in the image introduced by the optical system. Optical aberrations can both limit the field of view of the optical system and limit the position of the observer relative to the optical system. One technique for reducing the aberrations of an optical system is to use the Schmidt principle in the design of the optical system. The Schmidt principle states that image formed by spherical concave reflector with an aperture at the center of curvature and using collimated input light, is a concentric spherical surface with half the radius of the spherical concave reflector.

An example of a virtual panoramic display is a "bird bath" magnifier system. A bird bath magnifier system uses a real image that provides illumination for the virtual image behind a concave mirror by way of a beam splitter. A bird bath magnifying system typically takes advantage of the Schmidt principle by using a curved real image, positioning the observer at the center of curvature of the mirror, and tilting beam splitter so that the curved real image, mirror and observer form an on axis optical system. A variety of limitations exist, however, using the bird bath magnifier system. For example, it generally has a limited field of view for the observer. The field of view is often limited to a horizontal field of view of less than about 40 degrees and a vertical field of view of less than about 30 degrees. Furthermore, the bird bath magnifier is often difficult to scale up to larger fields of view due to the complexity of using many real images and tiled beam splitters and properly overlapping the virtual images. Another limitation is the use of beam splitting elements which reduces the over all light efficiency of the magnifier. Accordingly, the bird bath magnifier is often extremely complex and expensive, has limited use, and has not been generally been used for commercial applications.

Another example of a virtual panoramic display system is commonly termed the "mirage" system. Similar to the bird bath magnifier, the mirage system includes an optical system, which has a large concave mirror. An image source is generally a projector, which uses specialized projection optics, to direct and illuminate an image onto a real display surface. The user sees a magnified image of the display surface in a large concave mirror. In most cases, the observer is below the display surface and sees the image of the display surface reflected in the mirror. This arrangement of display surface, concave mirror, and observer form an off axis optical system. The mirage system is more light efficient than the previous example since a beam splitter is not used in this optical arrangement. The mirage system, however, also has numerous limitations. The first limitation is the complexity introduced in the optical system by the off axis optical arrangement. The mirage system cannot take advantage of the Schmidt principle. The mirror used in the mirage system typically is a more complex shape than a simple spherical mirror. For example, it has a limited field of view, similar to the previous conventional system. In fact, the field of view is often less than about 200° in the horizontal direction and less than about 45° in the vertical direction. Again the off axis viewing limits the vertical field of view. It also creates significant optical aberrations (e.g., distortions) near edges of the image being displayed due to the off axis viewing of the virtual image. Furthermore, the mirage system is costly, and has limited use in the commercial world.

From the above, it is seen that a technique for viewing an image in a display system which is cost effective and provides clear images is desirable. Furthermore, a technique for viewing a panoramic virtual image without significant optical aberrations with both large horizontal and vertical fields of view is desirable. Furthermore a technique for viewing a panoramic virtual image where the quality of the image is insensitive to the position of the observer relative to the optical system is desirable.

SUMMARY OF THE INVENTION

According to the present invention, an improved technique for observing a virtual image in a display using a novel light emitting surface is provided. The virtual image can be viewed by an observer at larger viewing angles than conventional systems for providing a relatively clear and realistic image. In other embodiments, images both real and virtual can be viewed at the same time using a novel light emitting surface.

In a specific embodiment, the present invention provides a novel method for observing an virtual image. The method includes a step of emitting light from a light emitting surface ("LES") from a first side to reflective magnifying optical system, RMOS, within a field of view of an observer. The LES provides light in the form of an image behind RMOS, which can be a variety of shapes, including annular, spherical or conic, and designs including front surface mirrors, second surface mirrors or complex reflectors, and sizes. The method also includes a step of observing the image through the LES on a second side. In most of the embodiments, the first side is opposite of the second side. Accordingly, the LES emits light to form an image from the first side and also allows the image there through to be viewed by the observer on the second side without significant problems such as substantial attenuation or aberrations or the like.

In an alternative specific embodiment, the present invention provides a novel display system for observing virtual and real images. The display system includes RMOS to display, for example, a virtual image. The system also has a light emitting surface, or LES, which includes first and second sides directly opposite from each other. The LES emits light on the first side to form the virtual image at an apparent distance behind the reflective surface. An observing region is also included on the second side of the LES for observing the image through the LES. A real image is also formed on the second side of the LES with light projecting towards the observer.

In an alternative specific embodiment, the present invention provides a novel rotating light emitting array. Many surfaces have a rotational symmetry where the surface can be described by a path in space which is rotated around the axis of rotational symmetry. If the path describing the surface is comprised of light emitting regions forming an array, and subsequently rotated around the axis of symmetry, the combination of the path and the rotation become the light emitting surface. The novel rotating light emitting array is designed to provide light in the first to form the virtual image at an apparent distance behind the reflective surface. In addition, the novel rotating light emitting array provides a means of rotating the rotating light emitting array, and a means of controlling the rotating light emitting array.

In yet an alternative embodiment, the present invention provides a virtual reality system, including a computer having a memory. The memory includes a novel computer code directed to emit light from a first side of a light emitting surface to a light redirection surface within a field of view of an observer. The LES provides the light to form an image behind the surface and allows an observer to observe the image through the LES on a second side, where the second side is substantially opposite of the first side. In most of these embodiments, the LES is constructed to permit a portion of the light from the RMOS to be observed by the observer without substantial optical distortion or attenuation. The LES is a rotating light emitting structure such as the one described below but can be others. Additionally, the present invention also has other computer codes to carry out at least the functionality and methods described herein.

Numerous benefits are achieved by way of the present invention over pre-existing or conventional techniques. In most embodiments, the present invention provides higher spatial and optical resolution over pre-existing techniques. Additionally, the present invention provides an image, which has a large field of view. In some embodiments, the field of view can be up to 360° in the horizontal direction and up to 180° in the vertical direction. Which essentially covers the entire space surrounding the observer. Furthermore, the present invention can be scaled up, as well as scaled down, depending upon the application. This allows the present invention to be used in a variety of applications, including, among others, virtual reality games, flight simulators, movies, general viewing displays, engineering workstations, and other applications. In preferred embodiments, the present invention achieves many, if not all, of these benefits without the use of cumbersome optics such as lenses or the like. These and other benefits are described throughout the present specification and more particularly in the descriptions below.

The present invention achieves these benefits and others in the context of known process technology. However, a further understanding of the nature and advantages of the present invention may be realized by reference to the latter portions of the specification and attached drawings.

DESCRIPTION OF A SPECIFIC EMBODIMENT

According to the present invention, an improved technique for observing a virtual image on a display using a novel light emitting surface is provided. The virtual image can be viewed by an observer at larger viewing angles for providing a relatively clear and realistic image. In other embodiments, images both real and virtual can be viewed at the same time using virtual and real displays. Specific details with regard to the present invention are discussed throughout the specification and more notably below.

Figure 1:
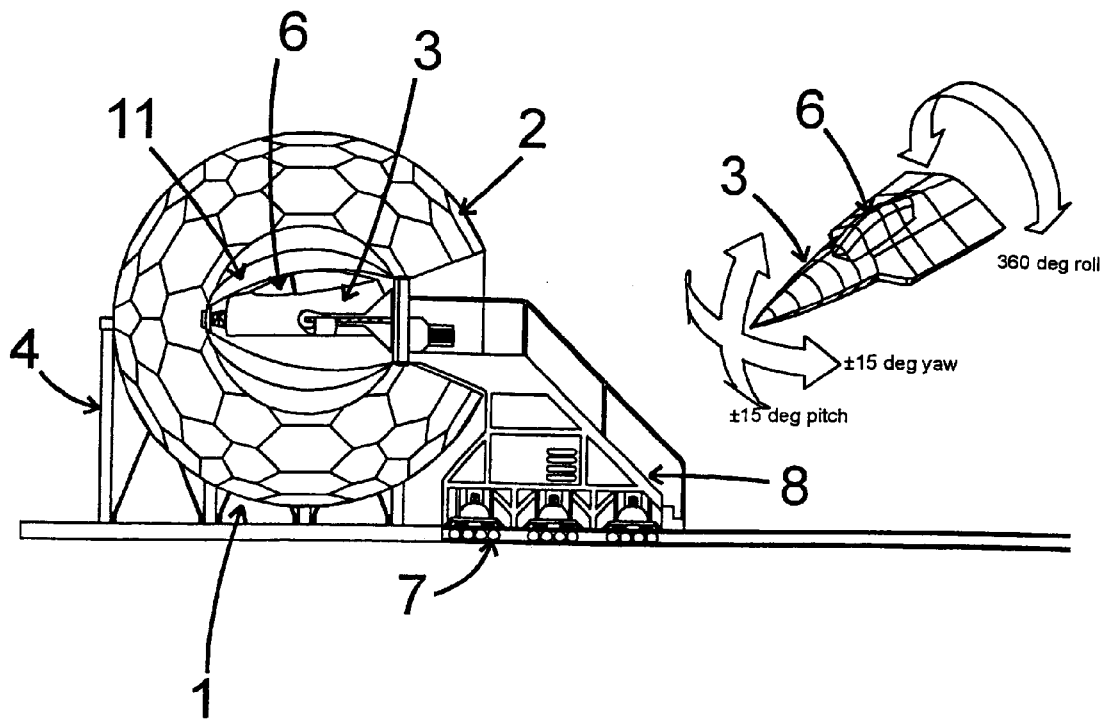
FIG. 1 is a simplified diagram of a flight simulator according to the present invention.
Figure 2:
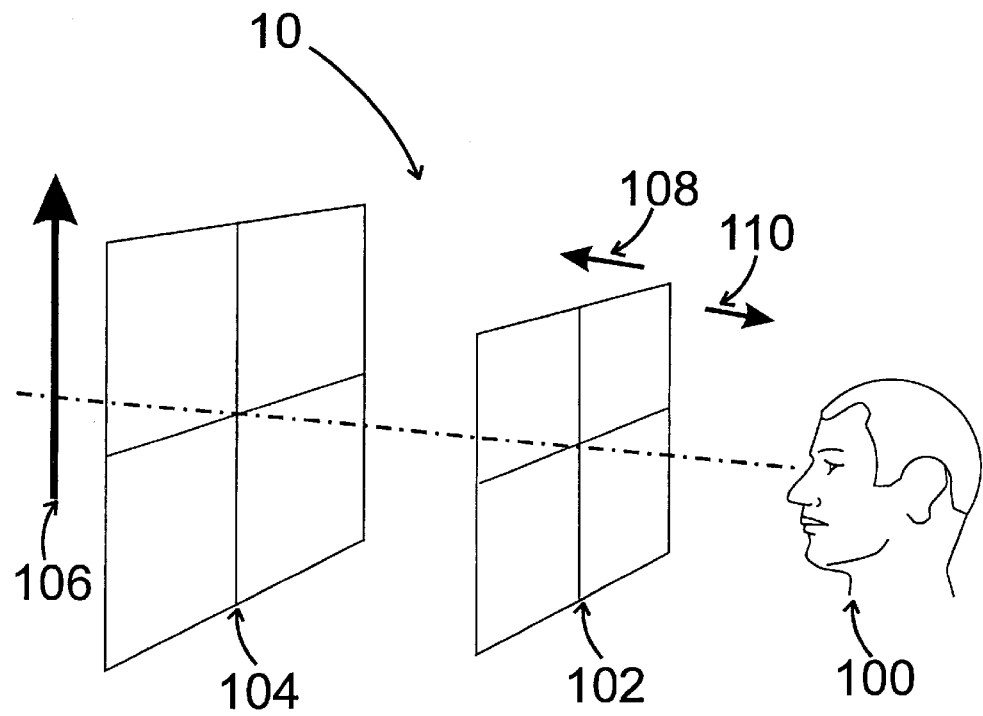
FIGS. 2–5 are simplified diagrams of a viewing system according to the present invention.
Figure 3:
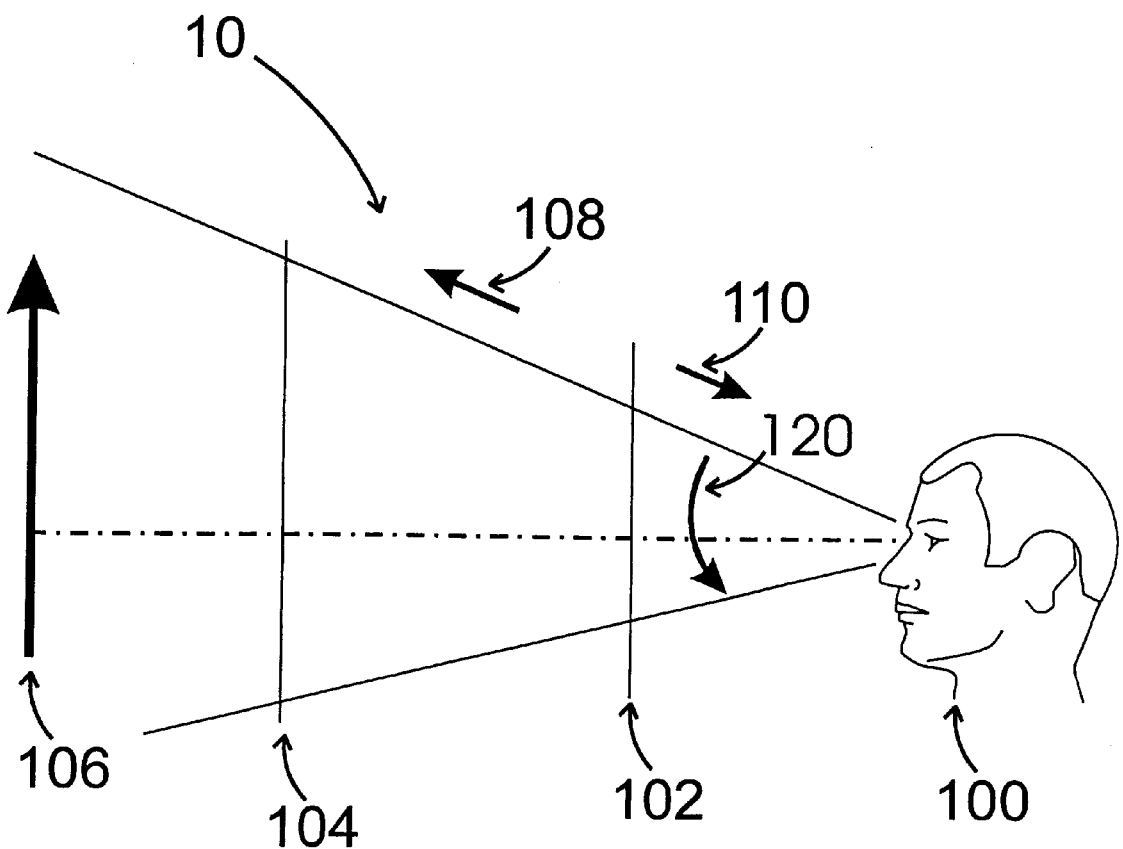

As merely one example of the present invention, FIG. 1 shows a simplified diagram of a flight simulator 1. This diagram is an illustration and should not limit the scope of the claims herein. One of ordinary skill in the art would recognize other variations, alternatives, and modifications. The flight simulator 1 includes a variety of novel features, which are provided to give a user or "pilot" of the flight simulator a realistic image of a view on a display and the "feel" of flight. These features include, among others, the display or screen 2, termed a reflective magnifying optical system ("RMOS"), which is held by a support structure 4. The screen 2 displays an image to an observer in a cockpit 6 of a module or pod 3. The image is transferred to the screen, which is spherical in shape, from a light emitting surface ("LES") 11. The LES is disposed within the periphery of the screen to provide images at substantially generally all viewing angles to the screen, as shown. Accordingly, the observer in the pod views the image, which can generally completely surround or immerse the observer. That is, the observer has a longitudual field of view of 360 degrees and a vertical field of view of 180 degrees.

Pod 3 is mounted on a movable support structure 8. The support structure inserts the pod 3 into the pod site of the flight simulator 1 by way of wheels 7 mounted on a track. The movable support structure moves in a horizontal manner or direction to be inserted in this manner. The support structure also can move or accelerate the pod in the flight simulator in the horizontal direction to simulate acceleration. The support structure can also move the pod in a vertical direction to simulate gravity, for example. Moreover, the support structure pivots the pod to provide up to a 360 degree roll, as well as a 15 degree pitch or yaw. Further details with regard to the LES and RMOS are described throughout the present specification and more particularly provided below.

FIGS. 2–5 are simplified diagrams of a viewing system according to the present invention. These diagrams are merely illustrations and should not limit the scope of the claims herein. One of ordinary skill in the art would recognize other modifications, variations, and alternatives. The present system 10 includes a variety of features such as a light emitting surface ("LES") 102, which is a source for a viewable image. Light emitting surface 102 is a source for image 106, which is displayed on a RMOS 104, e.g., front surface mirrors, second surface mirrors or complex reflectors. In particular, LES 102 projects a selected pattern (e.g., the image) of light to the RMOS 104. Observer 100 views image 106 behind the RMOS mirrored surface 104 through LES 102. Image 106 is behind the RMOS at a position that can be calculated by the known methods of optical propagation.

As shown, LES 102 has a variety of novel characteristics. For example, LES allows light to be directed in a direction 108 from one side of the LES to the RMOS. LES also allows observer 100 to view image 106 through the LES, without substantially impairing the view of the image through the LES. LES also directs illumination in one direction 108 and is substantially transparent to an observer in the other direction 110. That is, the image from the light redirection surface transmits light representing the image through the LES to be viewed by the observer 100.

Furthermore, LES is made of durable elements, which are light weight and resistant to a variety of ambient or environmental conditions, e.g., moisture, heat. In a specific embodiment, the LES is made by way of a plastic, glass, metal, or combination thereof. The LES should be easy to clean and maintain. Of course, the type of material used for the LES depends highly upon the application. Examples of LES materials are provided throughout the present specification and more particularly below.

In some embodiments, LES is shielded for additional protection against mechanical damage. For example, LES may have a shield which is clear to the observer on the observer side to prevent a possibility of any damage to the LES. The shield can be made of a variety of suitable materials that are transparent, durable, and easy to maintain. This material may be transparent plastic or glass. Additionally, the material should be able to withstand direct mechanical impact from flying objects such as flying bottles or cans from an observer. Furthermore, the material should be easy to clean and maintain with simple household chemicals such as ordinary water and cleaning solutions including surfactants. Of course, the type of material used depends highly upon the configuration of the present system.

The distance between the LES and the observer is selected for the particular application. The observer, however, can almost be at any location behind the LES. This aspect of location is one of the benefits of the present invention. The observer can view the image at a distance which is relatively far from the LES, which tends to create more distortion, however. As the observer comes closer to the LES, the image on the RMOS becomes less distorted. The observer can even come right up to the LES in some embodiments. In some embodiments, the position of the observer to the LES is fixed. Alternatively, the position of the observer to the LES may vary. Furthermore, the position of the observer to the LES can be fixed and then vary in-situ in some embodiments.

The distance between the LES and the RMOS can be fixed or varied. For example, in some embodiments, the distance between the LES and the RMOS is fixed. Alternatively, the distance between the LES and the RMOS varies. Furthermore, the distance between the LES and the RMOS is fixed at certain times and varies at other times. A varying distance can be used to provide focus to the image on the RMOS. This technique of varying distance complies with varifocal optical systems or the like. In most embodiments, however, the distance between the LES and the RMOS should comply with the following mathematical relationship.

$$R > LES > R/2$$

where R=radius of the RMOS; and
LES=distance from the RMOS to the LES.

As shown in the above equation, the distance between the LES and the RMOS must generally be less than the radius of the RMOS but greater than one-half of the radius of the RMOS. In some embodiments, the distance also can be equal to one-half of the radius of the RMOS. This one-half distance generally provides colluminated light to the RMOS. Of course, the exact distance or distances, if varied, depends highly upon the particular application.

System 10 also illustrates a vertical (e.g., up and down) field of view 120. Preferably, the field of view is greater than about 45° or greater than about 90° or even greater than about 120° to about 180°. Of course, the exact field of view depends highly upon the application, but is not limited to a particular range.

Figure 4:
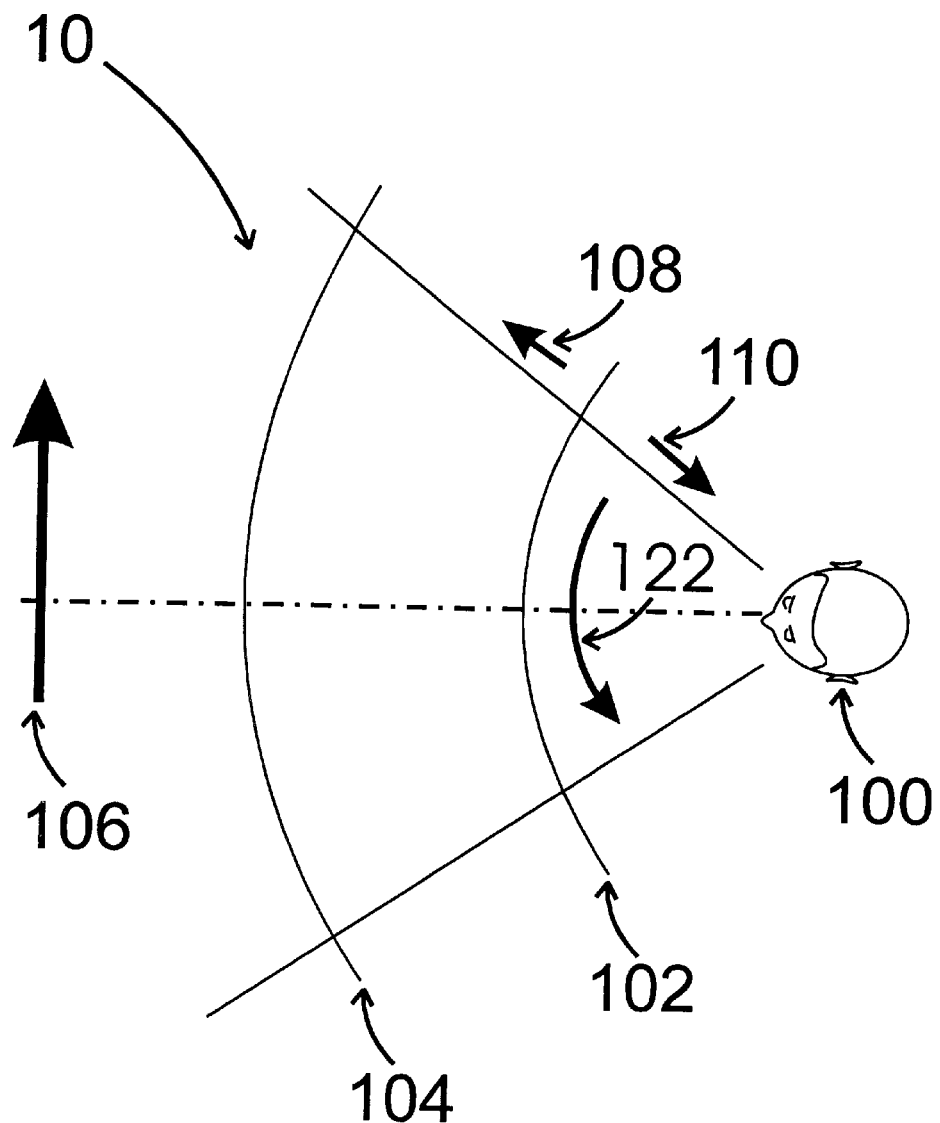

Horizontal field of view is illustrated by way of the top-view diagram 10 of FIG. 4, for example. System 10 includes similar elements as shown in the previous FIG., as well as others. For example, system 10 includes the observer 100, the LES 102, and the RMOS 104. LES also directs illumination in one direction 108 and is substantially transparent to an observer in the other direction 110. That is, the image from the light redirection surface transmits light representing the image through the LES to be viewed by the observer 100.

The top-view diagram of system 10 also illustrates a horizontal (e.g., lateral) field of view 122. In some embodiments, the horizontal field of view ranges from about 60° to about 90° and greater. Preferably, the field of view is greater than about 180° or greater than about 200° or even greater than about 270° to about 360°. Of course, the exact field of view depends highly upon the application, but is not limited to a particular range. The horizontal and vertical fields of view in general define the angular extent of the RMOS. The design of the RMOS is dependent on the application. The RMOS is in general any optical system which reflects light which is directed to the RMOS. The RMOS can be of several designs including but not limited to front surface mirrors, second surface mirrors, or complex reflectors.

As merely an example, a front surface mirror is a mirror where a reflective coating is deposited upon a substrate, which can be transparent or nontransparent. Light directed onto the front surface mirror reflects at the coating surface according to known laws of optical propagation. The front surface mirror has an advantage of being easily formed on many different substrates such as a glass, a metal, and others, and can assume a variety of shapes such as flat, annular, spherical, and others.

A second surface mirror is a mirror where a reflective coating is deposited on the back surface of a substrate that is substantially transparent, typically glass or plastic. The light directed onto a second surface mirror refracts and passes through the substrate, reflects off of the reflective coating, passes back though the substrate, and refracts as it leaves the second surface mirror. The second surface mirror has an advantage that the reflective coating surface is protected by way of the transparent substrate. In addition, the front surface and back surface of the substrate need not be the same shape, thus higher levels of optical correction can be applied to the RMOS. A known example of a optically corrected second surface mirror is a Mangine mirror, where zonal spherical aberration is more highly corrected. Of course, other examples also exist.

A complex reflector may include other refractive materials i.e. a lens or lenses in front of a front or rear surface mirror. Such systems are typically referred to as catidoptic optical systems. Typically these complex reflector systems improve the optical correction however suffer from the disadvantage of having more elements. Depending upon the particular embodiment, these complex reflectors can also be used within the spirit and scope of the present invention.

Figure 5:
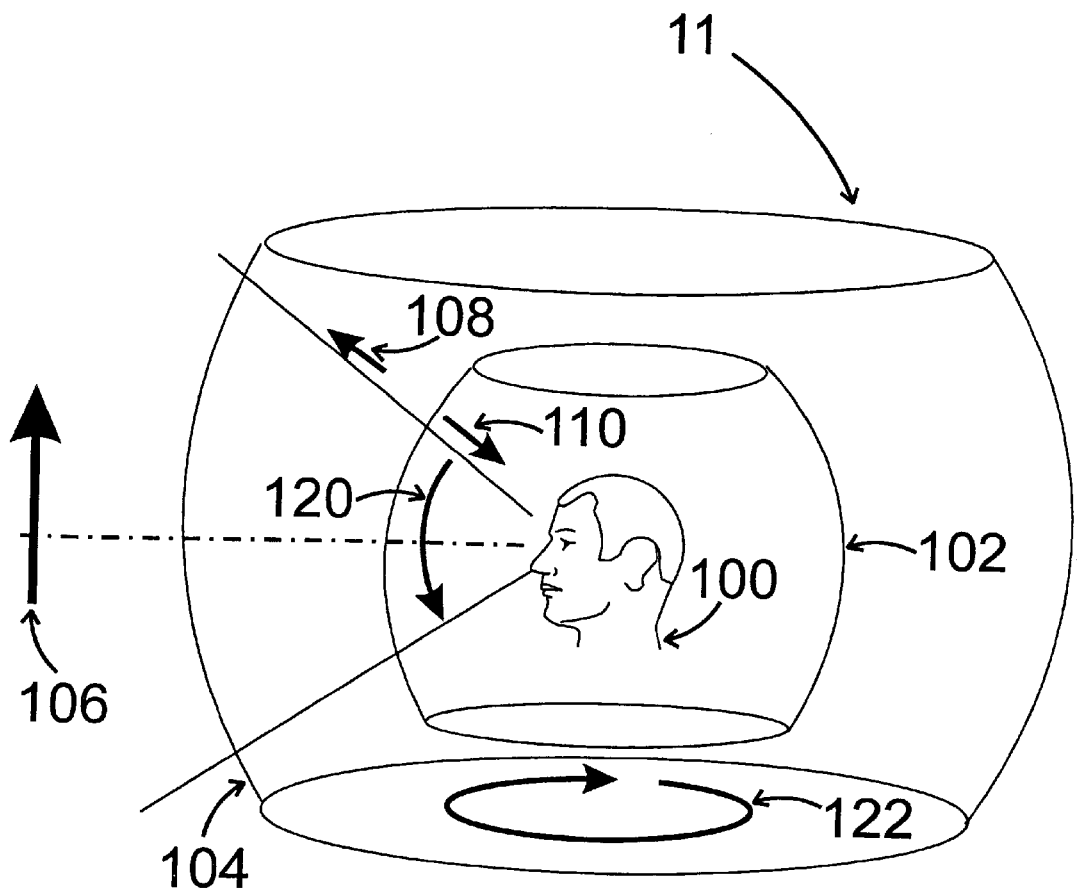

FIG. 5 illustrates a simplified 360° horizontal viewing system according to the present invention. As shown, like reference numerals are used to define system 11 as the previous system for easy reading. The system 10 has the observer 100, the LES 102, the RMOS 104, and the image 106 on behind the RMOS. LES illuminates image 106 onto RMOS 104. In a specific embodiment, RMOS 104 is a mirrored surface, either a front surface mirror, or a second surface mirror, which is concave and is annular in shape. That is, mirrored surface is defined around observer 100 and also surrounds LES 102. Preferably, LES is concentric to mirrored to present a image with an apparent uniform distance to the observer 100. In a specific embodiment, the mirror surface is a spherical surface and the LES is spherical surface with half the radius of the mirror surface. The image presented to an observer is collimated and the perception of the image is independent of the location of the observer within the viewing region defined by the second side of the LES. However more advanced designs can also incorporate a LES surface shaped to match a particular imagery of a scene.

The embodiment of FIG. 5 can be modified with any of the features described herein as well as others. For example, the distance between the LES and the RMOS can be adjusted depending on the application. The RMOS can also use a variety of mirrored surfaces. Additionally, the observer viewing the RMOS can move at almost any location behind the LES to view the image on the RMOS. The LES can include those described herein and others. An additional benefit of the present embodiment is the ease of viewing up to 360 degrees in the horizontal direction. Accordingly, the present embodiment can be used to provide, for example, the flight simulator such as the one shown above and others.

Figure 6:
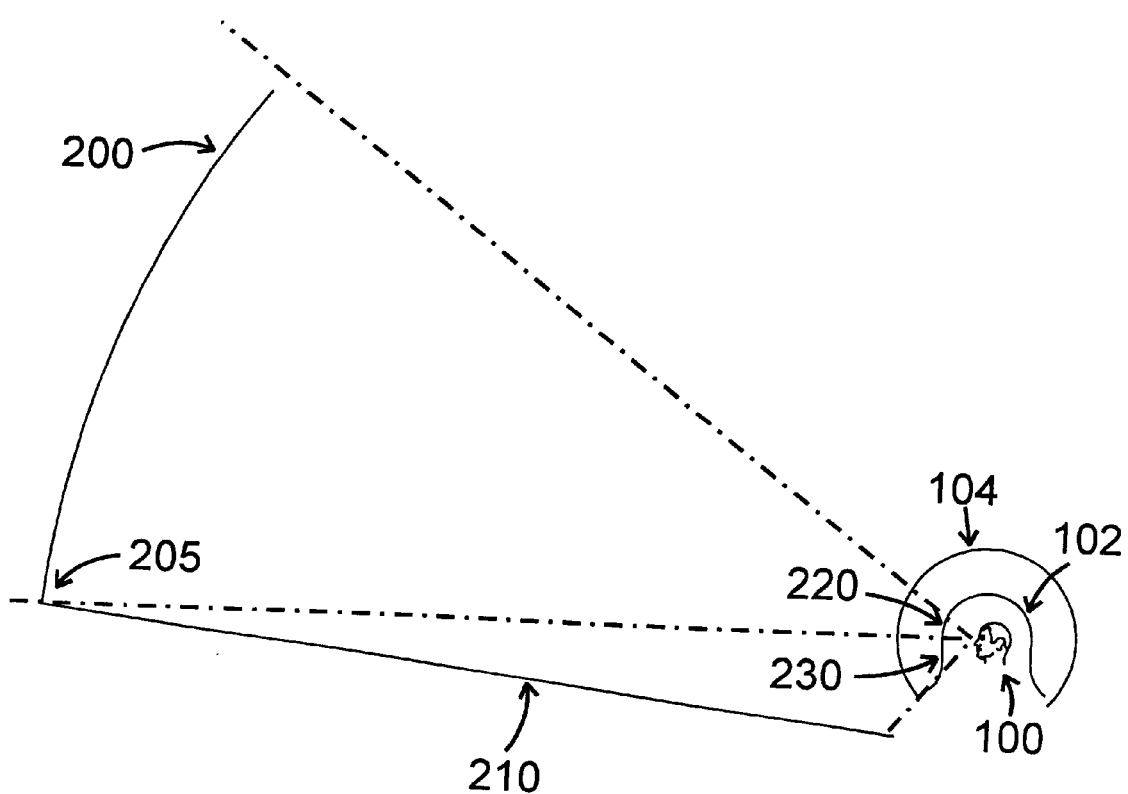
FIG. 6 is a simplified diagram of a shaped LES corresponding to a shaped virtual image according to the present invention.

FIG. 6 is a simplified diagram of a shaped LES surface according to the present invention. Like reference numerals are used to describe this embodiment as the previous embodiments. An example is a driving simulator, where above the observer the image behind the mirror is essentially at infinity above the horizon, 205, i.e., the sky 200, and where the road surface 210 and surrounding terrain sweeps in towards the observer forming a large plain in which the observer is driving. Using the properties of optical imaging, the shape of the LES in conjunction with the shape of the mirror can be combined to form the image representing the combination of the infinite sky image and the road terrain image. Assuming that the mirror 104 is a spherical mirror, the region of the LES forming the infinite image 220 is a spherical shape with a radius equal to half the radius of the spherical mirror, and the region forming the plain region 230 is a torus shape.

Observer 100 views image 106 from a location behind the LES. More particularly, observer 100 is within an annular periphery of both the LES and the light redirection surface.

Image 106 is directed off of the light redirection surface through the LES 102 to be viewed by the observer. Accordingly, LES transmits light in one direction and allows light to pass therethrough in the other direction without substantially impairing the view of the image through the LES. Furthermore, LES is made of durable elements, which are light weight and resistant to a variety of ambient and environmental conditions, e.g., moisture, heat. The distance between the LES and the observer is selected for the particular application. Additionally, the distance between the light redirection surface and the LES can be selected for the particular application. The LES and the light redirection surface are also generally parallel to each other to prevent a possibility of image aberrations or the like. The entire system should be capable of being scaled up, as well as being scaled down.

As noted, the above system can be scaled up, as well as scaled down, depending upon the application. In a large viewing display embodiment, the entire viewing system including the LES and light redirection surface can be placed in a room, e.g., building structure. As merely an example, the system can be used for a flight simulator or a large viewing room, which can be as large as 400 square feet or even greater. Alternatively, the system can be used in a point application system such as a virtual reality display, which the observer views the image through a window. System size often depends highly upon the application, however.

Figure 7:
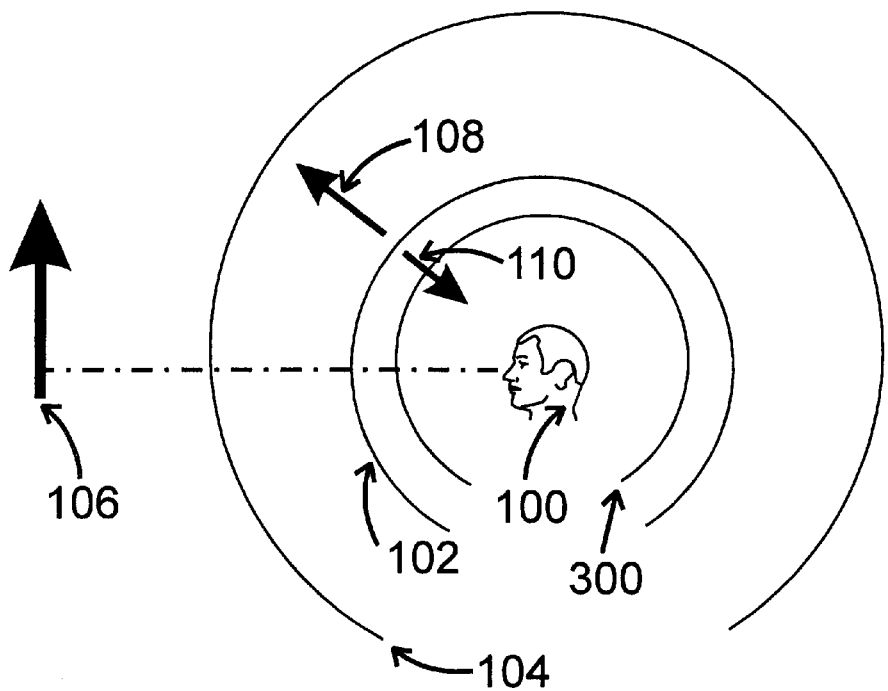
FIG. 7 is a simplified diagram of a polarization blocking filters according to the present invention.
Figure 7:
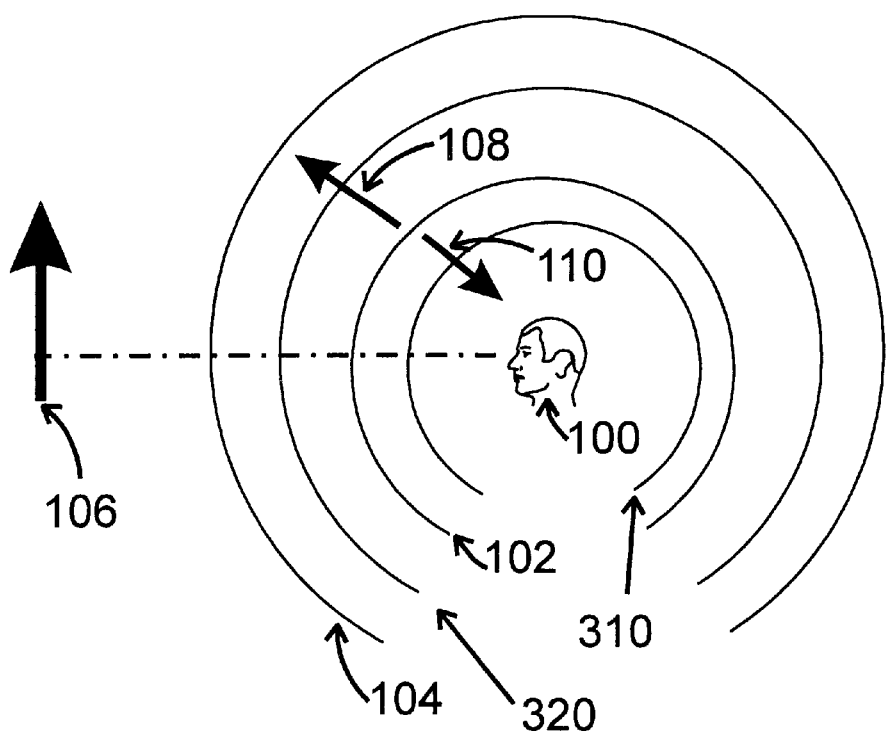

FIG. 7 shows two examples of simplified systems using filters to block unwanted stray light in the display system. Like reference numerals reused in this embodiment as the previous embodiments. As shown, the filter system has the observer 10, the LES 102, the RMOS 104, and the image 106. Additionally, the system has a variety of filters 300, 310, and 320. Stray light can be present in the current invention since light from the LES reflecting off of the RMOS and passing through the LES to the observer can scatter off of the observer or objects surrounding the observer. Alternately in cases where the RMOS does not completely surround the observer, objects or light sources behind the observer can cause stray light. The filter system is used to block this stray light. A method of blocking the stray light is to use a polarization based filter system. The combination of a polarizer and quarter waveplate can form a filter system to block the stray light reflected off of the RMOS. The first example is where the combination 300 of a polarizer and quarter waveplate are on the second side of the LES. The second example shows a case where the polarizer 310 is on the second side and the quarter waveplate 320 is on the first side. Polarizers and quarterwave plates as either separate elements or combination elements are readily commercially available from, for example, the Polaroid Corporation. Those skilled in the art will recognize that many different configurations of filter systems exist to block the stray light and the above examples are not meant to limit the form, materials or construction of the filter systems.

Figure 8:
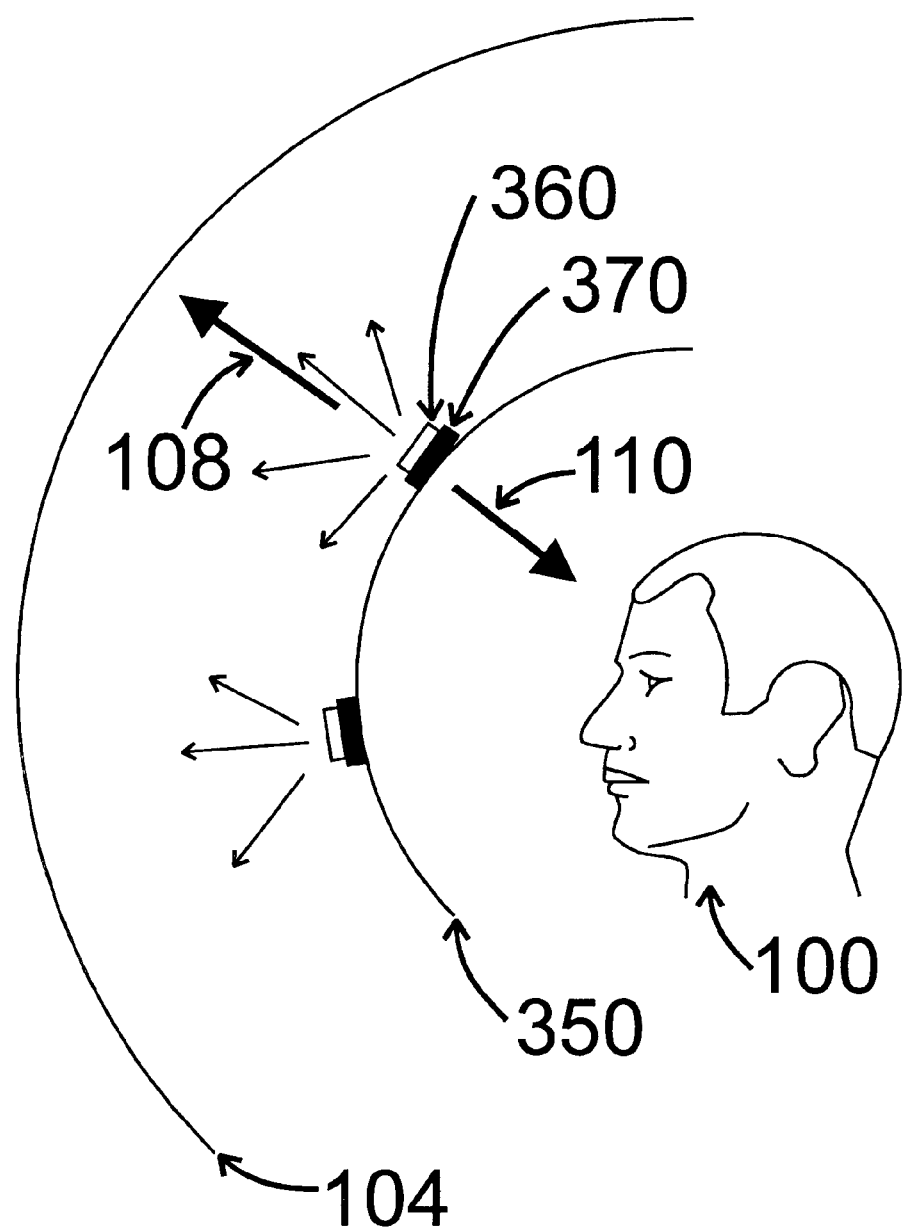
FIG. 8 is a simplified diagram of a static LES according to the present invention.

FIG. 8 is a simplified diagram of a viewing system using a static LES according to an embodiment of the present invention. The static LES 350 is formed by a suitable transparent material such as glass, or plastic with regions of light emitting materials 360 in proximity to light blocking materials 370. The light emitting materials are disposed on the first side of the LES with the light blocking materials in proximity to the light emitting materials. The light blocking materials are positioned as to allow the emission of light from the light emitting materials in a direction 108 towards the RMOS 104. The light blocking materials are positioned as to prevent the emission of light from the light emitting materials to the second side of the LES in a direction 110. The light from the static LES emits from the light emitting materials, reflects off of the RMOS, then passes through the LES, and is seen by observer 100. The light emitting materials can be activated through a variety of means including ultraviolet light, infrared light or electrical potential. Examples of a ultraviolet activated material includes ultraviolet absorbing dyes such as Rhodamine 580, rare earth phosphors such as Er:YAG, or a variety of other materials that emit visible light when absorbing ultraviolet light. Examples of infrared activated materials include rare earth phosphors such as Er:YLF where a visible light photon is created by the absorption of two or more infrared photons. Examples of electrical potential activated materials include organic light emitting diode materials, and the conduction of electrical current is achieved by using a transparent conductor such as indium tin oxide or by very fine metallic conductors patterned onto the surface of the transparent material. Suitable light blocking materials placed in proximity to the light emitting materials can include a variety of black pigments such as dyes or paint, or coating such as black chromium. The density and placement of the light blocking materials is designed to allow a large fraction of the light reflected by the mirror surface to pass back though the LES to be observed by the observer 100.

Figure 9:
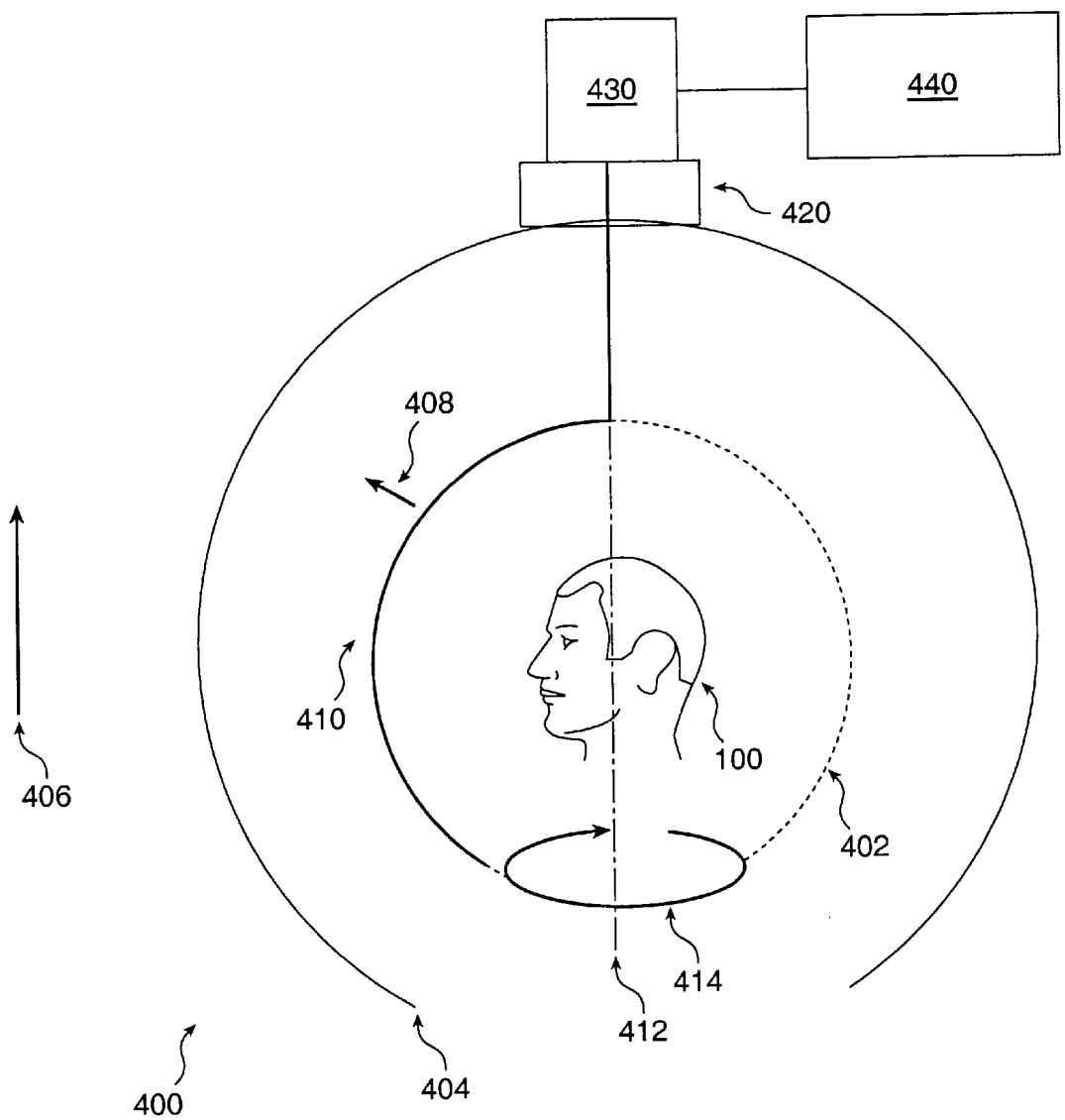
FIG. 9 is a simplified diagram of a viewing system using rotating light arcs according to the present invention.

The static LES presents a non-moving virtual image by selectively addressing the light emitting regions either by scanning the excitation light on controlling the flow of electrical current, a dynamic or time varying image can also be presented. The static LES has utility in the following areas of application including but not limited to advertising images, information display kiosks, and architectural applications. A more specific example would be a domed ceiling where a virtual image of the stars is presented to observers standing within the room. The above examples should not limit the scope of applications for a static LES surface FIG. 9 is a simplified diagram of a viewing system 400 using rotating light arcs according to an embodiment of the present invention. This diagram is merely an illustration and should not limit the scope of the claims herein. One of ordinary skill in the art would recognize other modifications, variations, and alternatives. As shown, some of the reference numerals in this embodiment are similar to the previous system for easy reading. System 400 has the observer 100, a RMOS 404, and an image 406 on the light redirection surface. System 400 also includes a rotating light arc LES 402 according to the present invention. As with the previous embodiments, the LES 402 illuminates light 408 to display image 406 behind the RMOS 404. In a specific embodiment, RMOS 404 is a mirrored surface, which is concave and is annular in shape. That is, mirrored surface is defined around observer 100 and also surrounds LES 402. Preferably, LES is parallel or concentric to mirrored surface to prevent a possibility of an aberration to the image or the like. Shape is scene dependent. Image 406 is defined at an infinite point behind the mirrored surface, as shown. The rotating light arc LES 402 rotates around a rotation axis 412 in a direction 414. The surface defined by the LES is formed by the path of the rotating light array 410.

The rotating light array 410 is formed by an array of light emitting regions(e.g., pixels) located along an path defined by the shape of the light emitting array. To create the image, the rotating light emitting array must often project the light in a manner that produces a viewable virtual image. The projection of light e.g., the modulation of the individual pixel elements, is coupled to the mechanical rotation of the rotating light emitting array. Thus, this embodiment includes a means of rotation 420, and a means of controlling 440 the light emitting array, and a means of synchronization and interface 430 between the rotation of the light arc and controller to form a suitable image. In the following example a specific implementation of the rotating light emitting array is given. Those familiar with the art will under stand that there are many similar methods of producing the rotation, control and synchronization, thus the following example should not limit the scope of the claims.

The system for creating and controlling the present invention is similar to many image generating devices such as computer systems or video devices. As an analogy a CRT display for a computer system is used. Typically an image generating device, a computer and the associated hardware and software creates image data that is to be present on the CRT. Typically a computer stores the image data in a frame buffer, which is a part of the computer memory reserved for the storage of image data. A specialized electronic circuit reads the image data from the frame buffer and creates the necessary video signals for controlling and displaying the image data on the CRT. These specialized circuits are typically called video cards, and also typically contain the frame buffer memory as an integral part of the video card. An example of this card is a VGA card for a desktop computer system.

Figure 10:
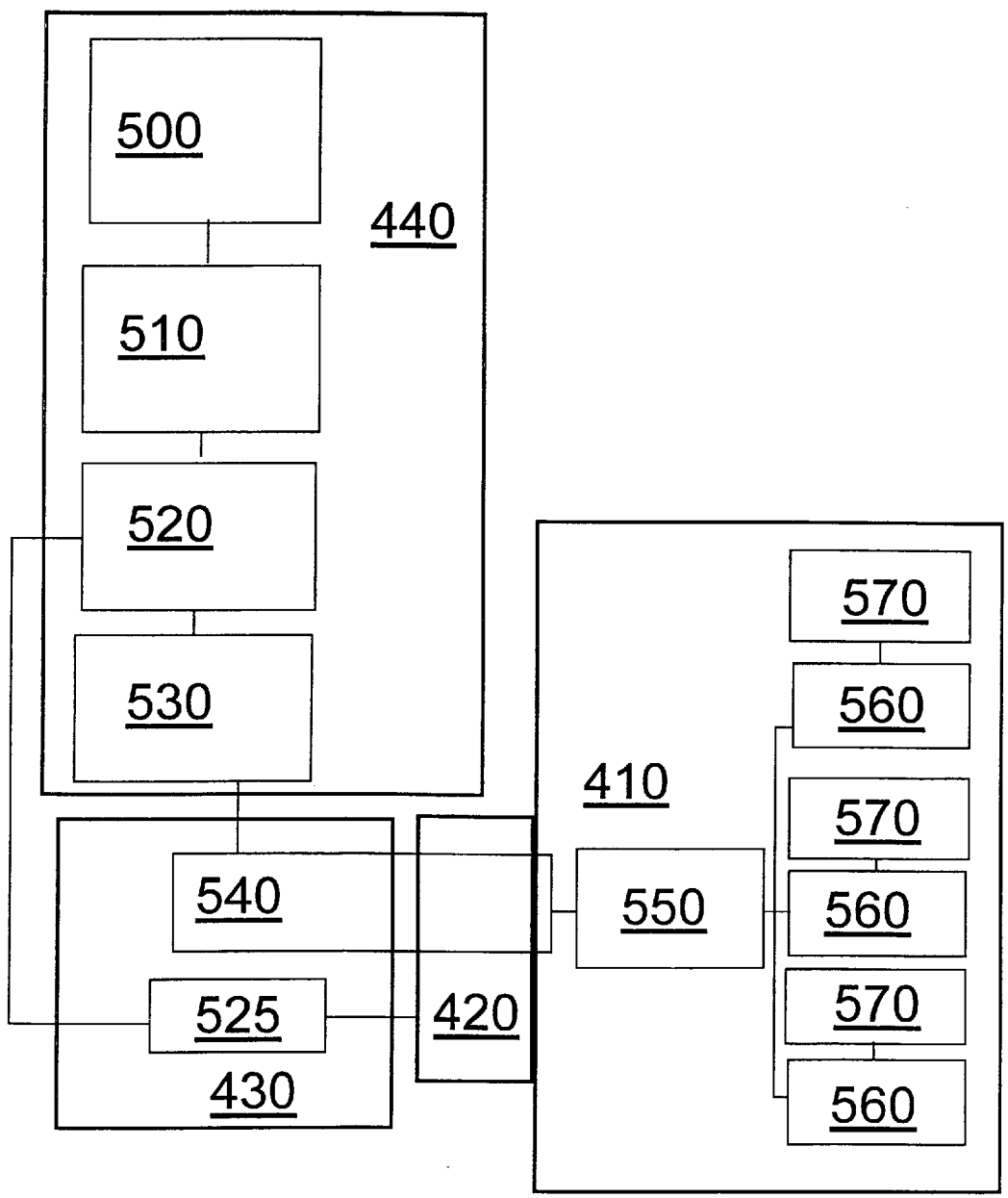
FIG. 10 is a more detailed diagram of the above viewing system according to the present invention.

In a similar fashion, the system for the creation and control of the images utilizes many of the same concepts. FIG. 10 is a simplified block diagram of a control system. An image generating device 500, such as a computer and the associated hardware and software, creates image data that is to be present as an image to the observer in the system. The image data is stored in a frame buffer 510. Due to the special symmetry of the present invention, the image generating device may, through the known mathematics of three dimensional rendering, produce data in the frame buffer that matches the symmetry image presented to the observer. An example of this symmetry would be an image that encircles the observer in a total of 360 degrees. The desirable symmetry would be based on angles related to the horizontal field of view and the vertical field of view. This symmetry can be built into the design of the frame buffer. As a comparison, a normal computer produces data in a frame buffer related to the x and y coordinates on the CRT screen, which is the natural symmetry of the CRT screen.

The specialized circuit 520 is used to read the data from the frame buffer and to present the image data to the observer. Data are coupled to the mechanical motion of the rotating light arcs. Since the image that is presented to the observer is created by sweeping the light arcs around the observer and modulating the individual light emitting elements on the light arc, i.e., pixels, to create an image on the RMOS. For example, a stable image requires, as the light arc rotates through 360 degrees, that the modulation of the pixels should repeat the same pattern. A synchronization and interface block 430 has an interface 540 and a position controller 525. The position controller 525 can either control the rotation rate of the means of rotation 420 in response to the data being sent by the specialized circuit, or more preferably can determine the angular position of the rotation light arcs at anytime. A rotation encoder determines the angular position of the rotation of the light arc. The position controller and the specialized circuit interact to form the stable image.

The signals from the output of the specialized read out circuit can be combined with an optional signal combiner circuit 530, which can use techniques of RF modulation, that is similar to the techniques used in cable television or fiber optics communication. The output of the signal combiner is fed to an interface 540. A portion of the interface 540 is located on the rotating light arc mechanism 410. The output from the receiver is then transferred to a signal demodulator 550. The demodulator sends the appropriate timing and control signals to the driver circuits 560 for the pixel arrays 570 located on the light arc. The light arcs produce the correct time dependent pattern to produce the image, which is seen by the observer.

Figure 11:
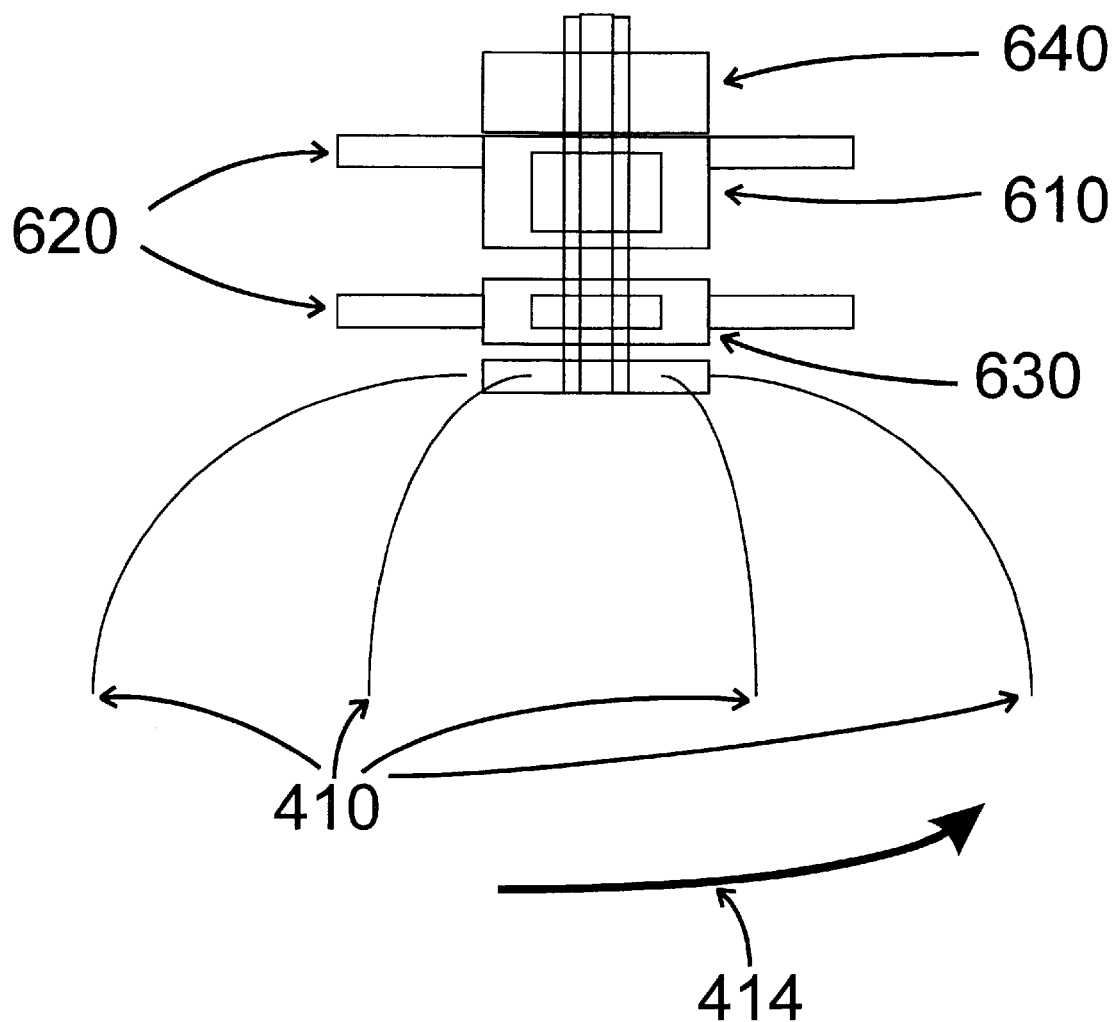
FIG. 11 is a simplified side-view diagram of a mechanical interface of the above viewing system according to the present invention.

FIG. 11 is a more detailed diagram of a mechanical interface 630 for the above system. Like reference numerals are used in this diagram as the previous diagrams for easy reading. The mechanical interface includes a plurality of rotating light arcs 410 which are coupled to a motor 610. The motor rotates the plurality of light arcs. The motor may be of many types including but not limited to AC servo motors, AC motors, DC motors, stepper motors, pneumatic motors. An encoder 640 is coupled to motor for providing location identification of the angular rotation position of the light arcs to the controller. These elements and others are placed on a fixed frame structure 620. The encoder may be from technologies such as optical encoders, Hall effects sensors, fiber gyroscopes, capacitive sensors. A preferred embodiment would be an optical encoder which can provide a very accurate measurement of the angular position of the light arcs. The signal from the encoder determines the angular position of the light arcs at any given time. The discrete angular positions of the light arcs can be labeled 0,1,2 . . . N where N is the number of angular positions of the light arcs around the full 360 degrees of rotation. When the encoder signals that angular position 0 has been reached, the data in the frame buffer corresponding to angular position 0 is read from the frame buffer. The data output is sent to an interface for transmitting the data to the rotating light arcs.

The rotation rate of the motor should be sufficient to present a flicker free image. Numerous studies have been conducted of the effects of refresh rate and flicker. Typically refresh rates of greater than 40 Hz are generally required to produce a flicker free image, such as movie screen refresh at 48 Hz. Thus, if a single light arc is used, the rotation rate should be about 40 Hz or 2400 RPM. For a plurality of light arcs, for example six, and a refresh rate of 60 Hz, the rotation rate should be 600 Hz.

Figure 12:
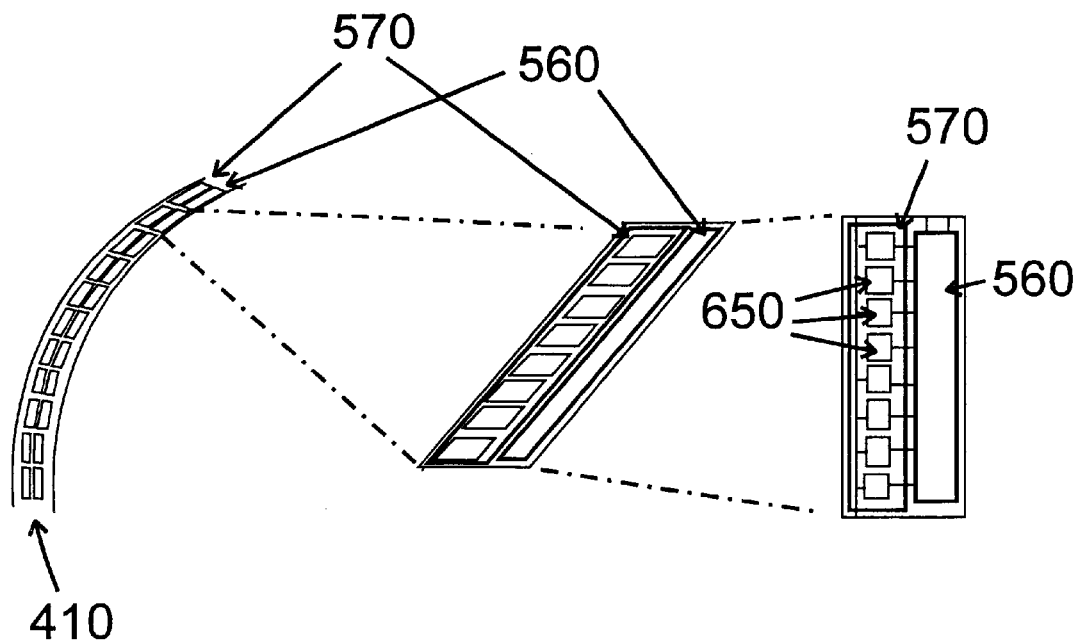
FIG. 12 is a simplified diagram of an LED light arc according to the present invention.

The rotating light array is formed by an array of light emitting regions, pixels, located along an path defined by the shape of the light emitting array. FIG. 12 shows the relationship between the array of pixel elements 570, the driver circuit 560, and the rotating light array 410. A plurality of driver circuits and pixel elements are also shown. The pixel elements on the light arc may be of many forms including light emitting diodes (LED), electroluminesent materials, porous silicon, electrically addressed phosphors, lasers, or illuminated light valves. Depending on the technology used, for example in porous silicon, the driver circuit 560 can be integrated with the pixel array 570. To create the image, the rotating light emitting array projects the light in a manner that produces a viewable virtual image. The projection of light, e.g., the modulation of the individual pixel elements, is coupled to the mechanical rotation of the rotating light emitting array. A requirement on the pixel elements is that the modulation rate of the pixel elements is high enough to create a modulated image. The modulation rate can be calculated based on the rotation rate of the rotating light emitting array and the desired resolution of the display perpendicular to the axis of rotation. The relationship is $M = R/t$, where M is the modulation rate, R is the resolution, and t is the time to complete on revolution of the light arc.

In the following section, the example is based on an LED light arc. LED has many desirable features including a very high modulation rate, commercial availability in all the primary colors, and high electrical efficiency. The LEDs 650 are arranged in a row along the light arc forming an array of pixel elements 570. Each LED corresponds to a pixel element along the light arc. Each LED is controlled by a driver circuit 560, which interacts with a control signal. Examples of blue LEDs that can be used in the current invention are the NSWB100 LEDs from Nichia Corporation. Green LEDs are the NSWG100 from the Nichia Corporation, and red LEDs are the HSMC-5670 from Hewlett-Packard, Inc.

Figure 13:
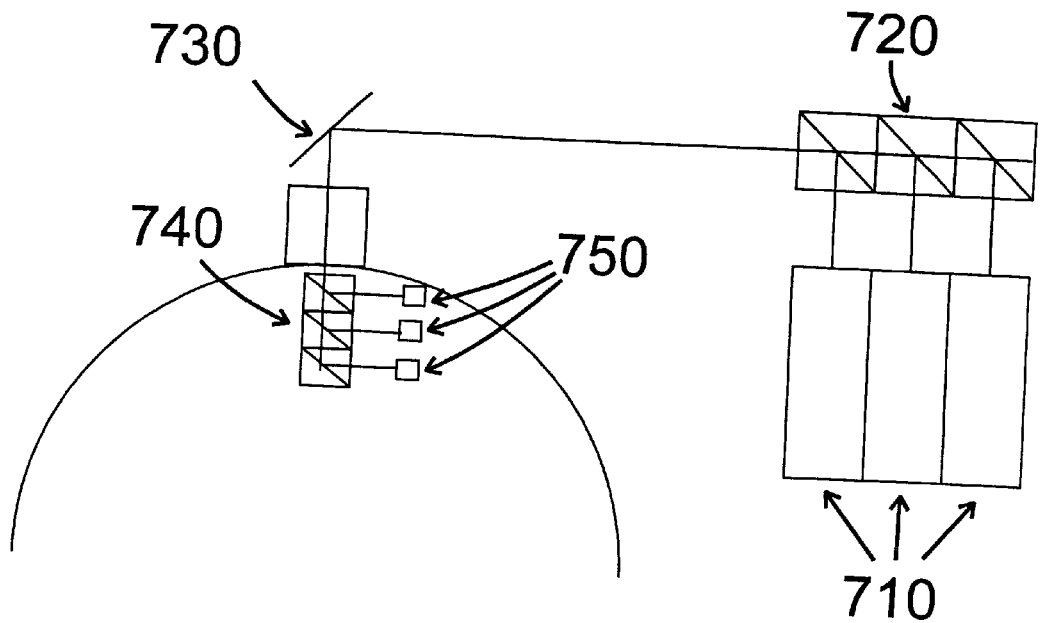
FIG. 13 is a simplified diagram of an optical interface according to the present invention.

FIG. 13 is a simplified diagram of an interface according to the present invention. This diagram is merely an illustration and should not limit the scope of the claims herein. One of ordinary skill in the art would recognize other modifications, variations, and alternatives. A form of the interface would be to provide a rotationally symmetric electrical contact that transmits the data to the rotating light arcs. However, the rapid rotation of light arcs might wear on the physical contacts, thus a preferred embodiment would be where the data is transmitted without physical contact via electromagnetic radiation. A requirement on the electromagnetic radiation is that it is of high enough frequency to support the data bandwidths associated with the image generation. Many forms of electromagnetic radiation are appropriate for this application, including radio waves, microwaves, and light. A preferred embodiment for the electromagnetic radiation source would be a semiconductor laser since the light output is readily modulated with the data information. FIG. 13 shows a plurality lasers 710, which are combined with an arrangement of optical beamsplitters forming an optical combiner 720. The data output from the frame buffer is encoded onto a semiconductor laser either through techniques of analog or digital data transfer. A mirror 730 directs the laser beams onto rotating light arcs. An optical demodulator 740 is used to separate the laser signals for a plurality of photodetectors 750. A photodetector located on the rotating light arcs receives the signal from the laser and subsequently transmits the data to the light arcs. Due to the symmetry of the rotating light arcs, the detector can be located along the rotation axis of the light arcs since this point does not move as the light arcs rotate. One skilled in the art can also design many types of electromagnetic data transfer systems. This example should not limit the claims of the transfer of the data to the rotating light arcs.

Once the data has been received by photodetector, the data can be demodulated to control the individual light emitting elements on the light arcs. Depending on the specific design, the data transfer and demodulating process can assume many forms and the following example should not limit the claims of the present invention. The demodulation process can be accomplished by also encoding a clock signal on the laser that is sending the data to the rotating light arcs. This clock signal is synchronized to the data so that every clock pulse corresponds to data associated with adjacent pixel elements on the light arc.

Figure 14:
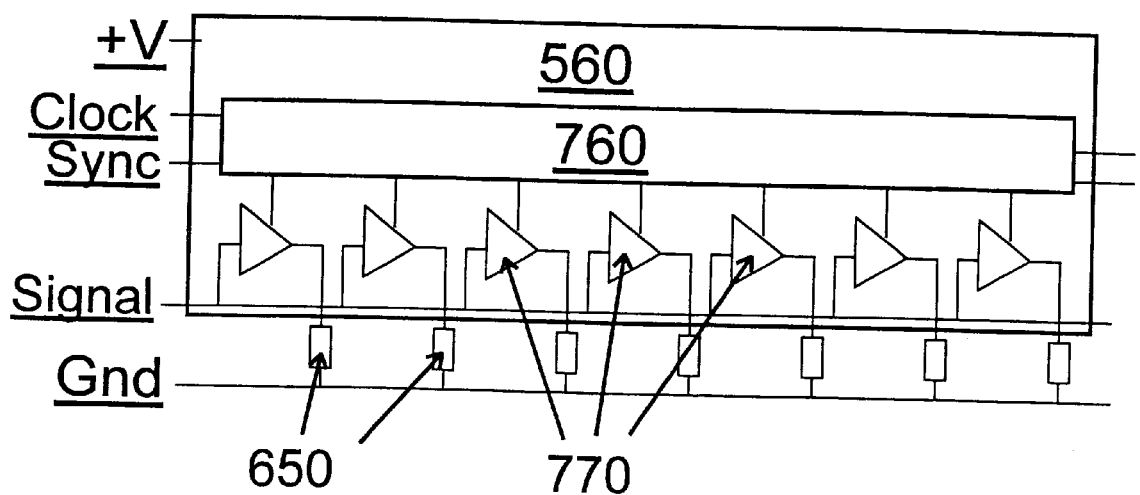
FIG. 14 is a simplified diagram of a circuit according to the present invention.

FIG. 14 is a simplified diagram of a circuit according to the present invention. This diagram is merely an illustration and should not limit the scope of the claims herein. One of ordinary skill in the art would recognize other modifications, variations, and alternatives. A simple electronic circuit 560 that controls the individual LED 650. Pixel elements include a shift register 760 and an array of sample and hold amplifiers 770. An example of an array of sample and hold amplifiers is an Analog Devices Inc, AD684 chip. Many examples of shift registers from standard TTL or CMOS logic are commercially available. The driver circuit 560 has several inputs corresponding to a clock signal, a sync signal, signal data, and power.

Figure 15:
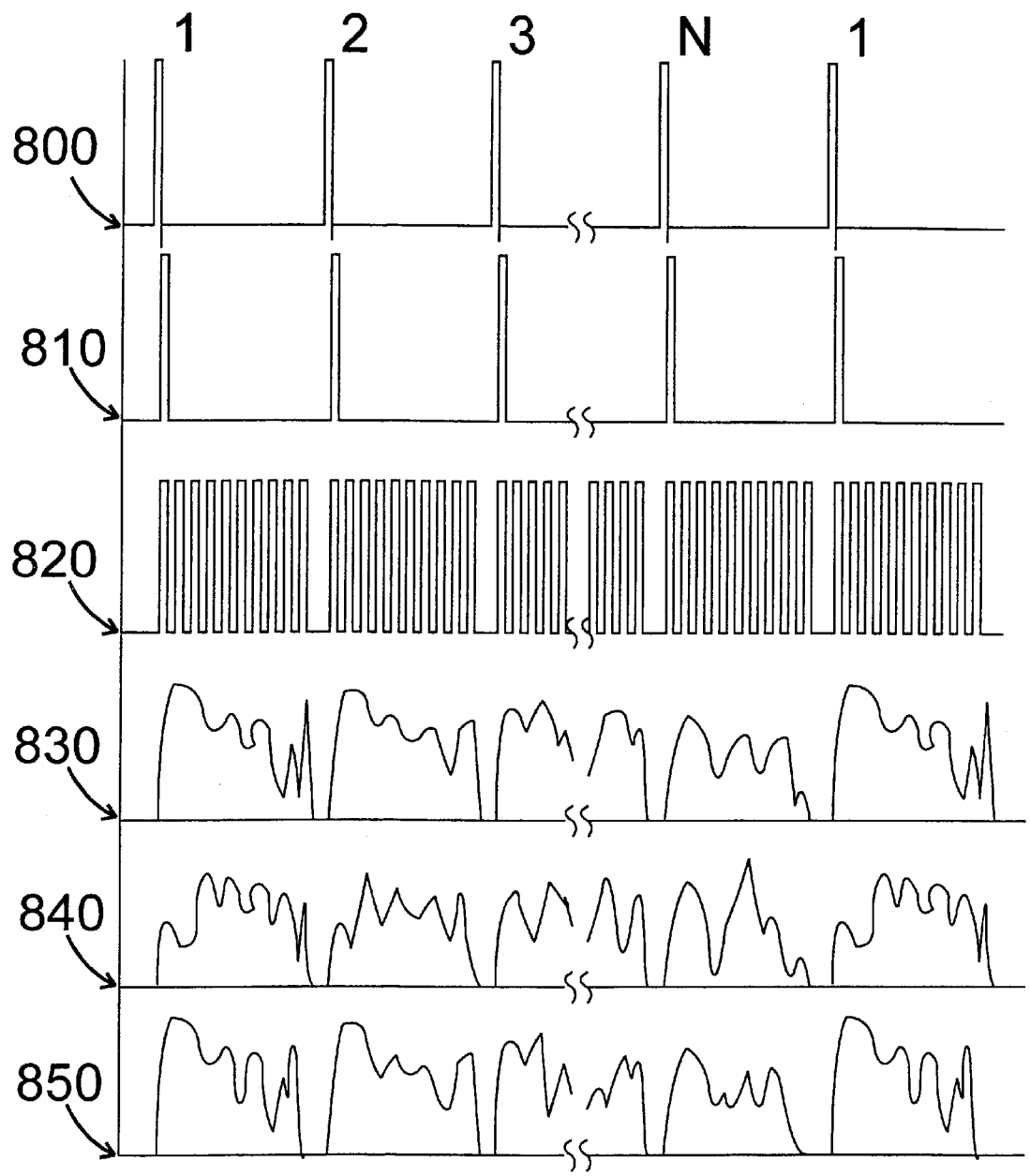
FIG. 15 are simplified diagrams of timing charts according to the present invention.

FIG. 15 is a simplified timing diagram according to the present invention. The diagram functions in the following manner. Signal 800 is the output of the position controller. At the start of a new angular position, the system generates a sync pulse signal 810, which starts the propagation of a data pulse through the shift register. The system generates a clock signal 820 to control the writing of the signal data 830 to the individual pixel elements. For the first clock pulse, the output of the shift register enables the first sample and hold circuit, which energizes the LED to a certain brightness level based on the value of the image data from the frame buffer. On the next clock pulse, data pulse propagates to the next output down the shift register which in turn enables the next sample and hold circuit. Again, the sample and hold circuit energizes the LED to a certain brightness level based on the value of the image data from the frame buffer corresponding to the next pixel, since the clock and the image data are synced together. This process continues down the row of LED in the light arc until all of the LEDs have been set to the appropriate brightness level based on the image data for that particular angular position. As the encoder signals the next angular position has been reached, the process of writing image data to the individual pixel elements repeats though the same process. Thus the complete image is created by writing all of the data in the frame buffer to the rotating light arcs as the arcs sweep through all N angular positions of the light arcs. As shown in the timing diagram, multiple signal data lines, 830, 840, and 850 can be used which could correspond to different colors within a single light arc, or multiple signals to different light arcs.

Figure 16:
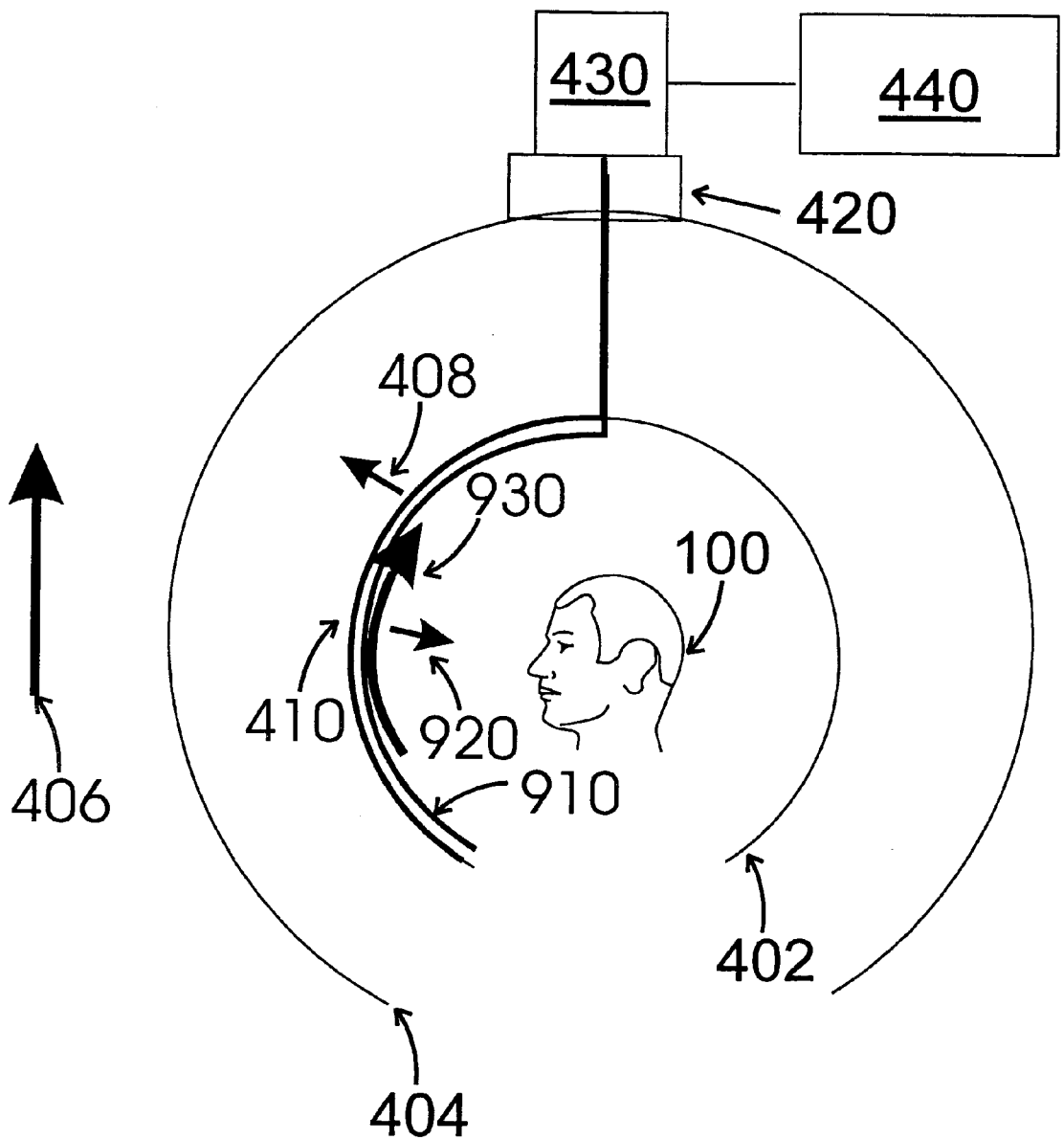
FIG. 16 is a simplified diagram of an alternative embodiment according to the present invention.

FIG. 16 shows an embodiment where in addition the virtual image 406 created by the light emitted from the first side 408 of the rotating light emitting array 410 light is emitted for the second side 920 from a rotating light emitting array 910 on the LES 402 forming a real image 930 at the LES surface. The real image is seen by the observer at the same time and at a different spatial location from the virtual image. An advantage of this embodiment is that it proves a second image surface where the observer can view. The real surface can be closer to the observer then the virtual surface, and provides parallax clues to the observer which greatly enhance the perception of depth in the virtual image. In a preferred embodiment, the light emitting array on the second side is constructed on the same rotating member as the light emitting array on the first side. Each array is separately addressable forming different real and virtual images. The utility of the virtual and real combined images is given in the following example. In a fight simulator application, the virtual imagery corresponds to the imagery out of the window, and the real image corresponds to a heads up display system for targeting or control. The previous example should not limit the scope of applications of the combined real and virtual images.

The control of the real image, thus the light emitting array on the second side can be developed in a completely analogous way from the control of light emitting array on the second side. Most of the same components can be used, and can be shared. The computer control system 440 generates the image data and produces two types of data, which are data for the virtual image, and data for the real image. The data are stored in a frame buffer twice as large or two frame buffers. The interface and synchronization system 430 can be used to transfer the data to the rotating light arc. And the means of providing rotation 420 can be used. The same method of encoding the data onto the electromagnetic transmitter can be used but at twice the bandwidth. The same design detector and demodulator circuit can be used except the demodulator separates the signals to the first and second side light emitting arrays. The technique of the separating signals is similar to a signal in a cable television line, which contains many signals and many televisions connect to the same cable can.

As seen in the above example, the concepts in the control of a single light emitting array, applies to a plurality of light emitting arrays forming multiple virtual images, or multiple virtual and real images. In addition, a plurality of light emitting arrays can be used to form a single virtual image which reduces the rotation rate to produce a flicker free image. As an example using 6 light arcs instead of 1 light arc reduces the required rotation rate to produce a flicker free image from 2400 RPM to 400 RPM, a much more modest rotation rate.

Although the above description has been made in terms of a general display system, the present invention can be implemented into a variety of applications. For example, the present invention can be applied to flight simulators, games (e.g., video games), general viewing displays, engineering workstations, and other applications. Additionally, the present invention can be applied to a relatively small display apparatus, which can be mounted on a user. Alternatively, the invention can be applied to a flight simulator, which uses a large open chamber or room. Of course, one of ordinary skill in the art would recognize these and other modifications, alternatives, and variations.

While the above is a full description of the specific embodiments, various modifications, alternative constructions and equivalents may be used. For example, while the description above is in terms of a flight simulator, it would be possible to implement the present invention with any display system. Therefore, the above description and illustrations should not be taken as limiting the scope of the present invention which is defined by the appended claims.

What is claimed is:

1. A method for observing an image, said method comprising:
   emitting light from a first side of a light emitting surface ("LES") to a reflective magnifying optical system ("RMOS") within a field of view of an observer, whereupon said LES providing said light to form an image on a light redirection surface which is behind said LES; and
   observing said image through said LES on a second side, said second side being substantially opposite of said first side, said LES being constructed to permit a portion of said light from said light redirection surface to be observed by said observer without substantial optical distortion or attenuation; wherein said LES comprising a rotating light emitting structure which revolves around said observer.

2. The method of claim 1 wherein said rotating light emitting structure selectively emits light from pixel elements to provide said image from said RMOS.

3. The method of claim 1 wherein said LES comprises a source selected from a plurality of organic light emitting diodes, a plurality of light emitting diodes, a plurality of electroluminescent materials, a porous silicon, a plurality of electrically addressed phosphors, a plurality of lasers, or a plurality of illuminated light valves.

4. The method of claim 3 wherein said light emitting diodes comprise a red colored diode, a green colored diode, and a blue colored diode.

5. The method of claim 1 wherein said rotating light emitting structure is rotating around said observer at a speed greater than about 600 revolutions per minute.

6. The method of claim 1 wherein said rotating light emitting structure is rotating around said observer at a speed greater than about 1,800 revolutions per minute.

7. The method of claim 1 wherein said LES rotates around said observer at a speed that forms said image in a flicker free manner.

8. The method of claim 1 wherein said RMOS comprises a substantially spherical concave mirror.

9. The method of claim 1 wherein said LES comprises a substantially spherical surface, said first side corresponds to an outside of said substantially spherical surface, said second side corresponds to an interior of said spherical surface, and said LES comprising an LES radius that is greater than about half of a radius of said RMOS.

10. The method of claim 1 wherein said first side of said LES corresponds to an outside surface, said second side of said LES corresponding to an interior surface, said LES being within a volume defined by the RMOS and within a radius that is greater than about half of a radius of said RMOS.

11. The method of claim 1 wherein said RMOS includes a horizontal viewing angle of greater than about 180 degrees.

12. The method of claim 1 wherein said RMOS includes a horizontal viewing angle of greater than about 300 degrees.

13. The method of claim 1 wherein said RMOS includes a horizontal viewing angle of about 360 degrees.

14. The method of claim 1 wherein said RMOS includes a vertical viewing angle of greater than about 90 degrees.

15. The method of claim 1 wherein said RMOS includes a vertical viewing angle of greater than about 120 degrees.

16. The method of claim 1 wherein said RMOS includes a vertical viewing angle of about 180 degrees.

17. A light emitting surface ("LES"), said light emitting surface comprising:
   a first side coupled oppositely to a second side, said first side comprising a plurality of sources for emitting electromagnetic energy to project as an image onto a reflective magnifying optical system ("RMOS"), said image projecting off of said RMOS and passing through said first side to be substantially visible by an observer facing at said second side;
   wherein said image being substantially visible to said observer having a horizontal viewing angle greater than about 180 degrees and a vertical viewing angle greater than about 90 degrees.

18. The LES of claim 17 wherein said image is a virtual image at an apparent distance behind said RMOS.

19. A display system for an observer, said system comprising:
   a reflective magnifying optical system ("RMOS"), said RMOS comprising a reflective surface to display a virtual image;
   a light emitting surface ("LES"), said light emitting surface having a first side and a second side, said first side emitting light to form said virtual image at an apparent distance in said RMOS; said LES comprising a rotating light emitting structure which revolves around said observer, said rotating light emitting structure comprising an array of light emitting sources, said array of light emitting sources being selectively addressed to provide said virtual image on said RMOS; and an observing region, said observing region being positioned on said second side of said light emitting surface, said observing region comprising a location for viewing said virtual image on said RMOS through said light emitting surface.

20. The display system of claim 19 wherein said RMOS is provided in an auditorium for viewing images.

21. The display system of claim 19 wherein said RMOS is provided in a flight simulator.

22. The display system of claim 19 wherein said RMOS is provided in a virtual reality game.

23. The display system of claim 19 wherein said RMOS is provided in an arcade game.

24. The display system of claim 19 further comprising a filter placed between said RMOS and said observing region, said filter reducing a possible reflection of light from said RMOS.

25. The display system of claim 24 wherein said filter is selected from a polarizer film and a quarter-wave film, or a combination polarizer-quarter-wave film.

26. The display system of claim 19 wherein said LES is operably coupled to an interface, said interface providing data to said LES, said data being selectively emitted as light from said LES to provide said virtual image on said RMOS.

27. The display system of claim 19 wherein said LES comprises a source selected from a plurality of organic light emitting diodes, a plurality of light emitting diodes, a plurality of electroluminescent materials, a porous silicon, a plurality of electrically addressed phosphors, a plurality of lasers, or a plurality of illuminated light valves.

28. The display system claim 27 wherein said light emitting diodes comprise a red colored diode, a green colored diode, and a blue colored diode.

29. A virtual reality system, including a computer having a memory, said memory comprising:

a code directed to selectively emit light from a first side of a light emitting surface ("LES") to a reflective magnifying optical system ("RMOS") within a field of view of an observer, whereupon said LES providing said light to form an image behind said LES and allowing a user to observe said image through said LES on a second side, said second side being substantially opposite of said first side, said LES being constructed to permit a portion of said light from said RMOS to be observed by said observer without substantial optical distortion or attenuation; wherein said LES comprising a rotating light emitting structure which rotates about said observer.

30. A light emitting surface ("LES"), said light emitting surface comprising:

a first side of comprising a plurality of sources for emitting electromagnic energy to project as an image onto a reflective magnifying optical ("RMOS"); and a second side coupled oppositely to side first side, wherein said image projecting off of said RMOS passes trough said first side to be substantially visible by an observer facing said second side.

* * * * *